US012566847B2

(12) United States Patent
Johansson et al.

(10) Patent No.: US 12,566,847 B2
(45) Date of Patent: Mar. 3, 2026

(54) PROTECTING AGAINST UNWANTED MESSAGING IN INSTANT MESSAGING SYSTEMS

(71) Applicant: International Business Machines Corporation, Armonk, NY (US)

(72) Inventors: Mattias Johansson, Dunwoody, GA (US); Cheng-Ta Lee, Cumming, GA (US); Michael Josiah Bolding, Smyrna, GA (US); Yun Pan, Roswell, GA (US)

(73) Assignee: International Business Machines Corporation, Armonk, NY (US)

( * ) Notice: Subject to any disclaimer, the term of this patent is extended or adjusted under 35 U.S.C. 154(b) by 173 days.

(21) Appl. No.: 18/638,967

(22) Filed: Apr. 18, 2024

(65) Prior Publication Data

US 2025/0328636 A1 Oct. 23, 2025

(51) Int. Cl.
*H04L 9/40* (2022.01)
*G06F 21/55* (2013.01)
(Continued)

(52) U.S. Cl.
CPC ............ *G06F 21/554* (2013.01); *H04L 51/04* (2013.01); *H04L 51/212* (2022.05); (Continued)

(58) Field of Classification Search
CPC ..... H04L 51/04; H04L 51/212; H04L 63/145; H04L 63/1441; H04L 63/14; H04L 63/1408; H04L 63/1416
See application file for complete search history.

(56) References Cited

U.S. PATENT DOCUMENTS 7,676,217 B2 3/2010 Zhu et al.
7,945,955 B2 5/2011 Katkar
(Continued)

FOREIGN PATENT DOCUMENTS

CN 110337107 A * 10/2019 .......... H04W 12/128
WO WO-03026331 A1 * 3/2003 .......... H04W 88/184

OTHER PUBLICATIONS

Ali A. Al-Hasan, El-Sayed M. El-Alfy, "Dendritic Cell Algorithm for Mobile Phone Spam Filtering", Procedia Computer Science, vol. 52, 2015, pp. 244-251. (Year: 2015).*
(Continued)

*Primary Examiner* — Zhimei Zhu
(74) *Attorney, Agent, or Firm* — CANTOR COLBURN LLP; Anthony Pallone

(57) ABSTRACT

Mechanisms are provided for delivering instant messages to recipient computing systems. An instant message is received for delivery to a recipient computing system (recipient) and is sent to the recipient which displays the instant message in a dialog interface. At substantially a same time, a lightweight initial scan/filter operation is executed on the message to determine a preliminary classification of the message as being benign or unwanted/malicious. If unwanted/malicious, a warning notification is sent to the recipient for display in the dialog interface, the message is processed via an analytics pipeline to determine a final classification, and a command message is sent based on the final classification to the recipient to update the dialog interface.

20 Claims, 9 Drawing Sheets

(51) Int. Cl.
H04L 51/04 (2022.01)
H04L 51/212 (2022.01)

(52) U.S. Cl.
CPC ...... H04L 63/145 (2013.01); G06F 2221/034
(2013.01); H04L 63/1408 (2013.01); H04L
63/1441 (2013.01)

(56) References Cited

U.S. PATENT DOCUMENTS

| | | | | |
|---|---|---|---|---|
| 9,064,112 | B2 | 6/2015 | Wang et al. | |
| 9,954,873 | B2 | 4/2018 | Mitchell | |
| 2003/0021244 | A1* | 1/2003 | Anderson | H04L 69/329 |
| | | | | 370/386 |
| 2005/0101306 | A1* | 5/2005 | Zabawskyj | H04L 51/212 |
| | | | | 455/414.1 |
| 2006/0128406 | A1 | 6/2006 | Macartney | |
| 2007/0027992 | A1* | 2/2007 | Judge | H04W 24/00 |
| | | | | 709/227 |
| 2008/0004048 | A1* | 1/2008 | Cai | H04W 4/14 |
| | | | | 709/206 |
| 2008/0004049 | A1* | 1/2008 | Yigang | H04L 51/58 |
| | | | | 709/206 |
| 2008/0052363 | A1 | 2/2008 | Pousti | |
| 2015/0169202 | A1* | 6/2015 | Wilson | H04L 51/212 |
| | | | | 715/752 |
| 2021/0360027 | A1* | 11/2021 | Boyer | H04L 51/212 |

OTHER PUBLICATIONS

Enkono, Fillemon S., & Suresh, Nalina. (2020). Application of Machine Learning Classification to Detect Fraudulent E-wallet Deposit Notification SMSes. The African Journal of Information and Communication, 25, 1-12. (Year: 2020).*

Anonymous, "About suspicious message alerts—Google Messages", Google Messages Support Website, https://support.google.com/messages/answer/11231641?hl=en, Mar. 12, 2024, 1 Page.

Brodkin, Jon, "FCC orders phone companies to block scam text messages", Article from Ars Technica website, Mar. 16, 2023, 5 Pages.

Cheng, Jerry et al., "SmartSiren: Virus Detection and Alert for Smartphones", MobiSys'07, Jun. 11-14, 2007, San Juan, Puerto Rico, 14 Pages.

* cited by examiner

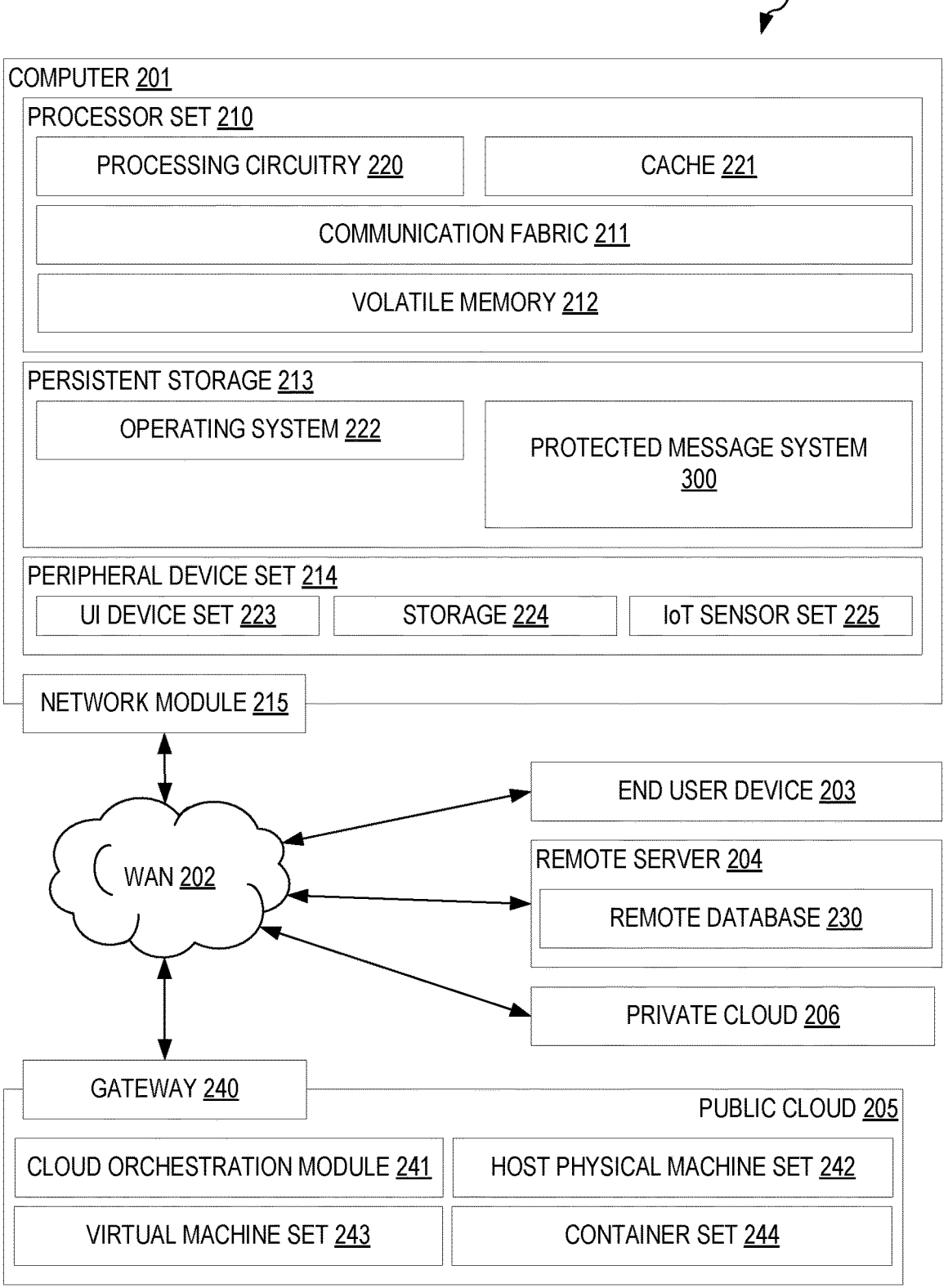

200

COMPUTER 201

PROCESSOR SET 210

PROCESSING CIRCUITRY 220          CACHE 221

COMMUNICATION FABRIC 211

VOLATILE MEMORY 212

PERSISTENT STORAGE 213

OPERATING SYSTEM 222          PROTECTED MESSAGE SYSTEM 300

PERIPHERAL DEVICE SET 214

UI DEVICE SET 223          STORAGE 224          IoT SENSOR SET 225

NETWORK MODULE 215

WAN 202

END USER DEVICE 203

REMOTE SERVER 204

REMOTE DATABASE 230

PRIVATE CLOUD 206

GATEWAY 240

PUBLIC CLOUD 205

CLOUD ORCHESTRATION MODULE 241          HOST PHYSICAL MACHINE SET 242

VIRTUAL MACHINE SET 243          CONTAINER SET 244

FIG. 2

PROTECTING AGAINST UNWANTED MESSAGING IN INSTANT MESSAGING SYSTEMS

BACKGROUND

The present application relates generally to an improved data processing apparatus and method and more specifically to an improved computing tool and improved computing tool operations/functionality for providing protections against unwanted messaging in instant messaging systems.

As happens with the invention of any new means of communication, entities will immediately try to figure out a way to exploit that means of communication for their own advantage. For example, with the creation of the telephone communication system, entities developed ways of exploiting telephone communication to perform "robo-calls" and telemarketing calls to reach individuals for their own gain. While some of these calls may not be malicious or nefarious, although still unwanted by the receipts, other such calls may be engaged in malicious and even criminal exploitation of individuals through nefarious means. This is especially true in modern digital communication, e.g., electronic mail, which has made it fairly easy to exploit individuals through communications that are either unwanted, or even malicious, and often appear to be legitimate communications that attempt to mislead individuals into performing actions that expose them to financial or even emotional harm.

Because of this, many tools have been developed to help protect individuals from such unwanted or even malicious communications. For example, with electronic communications, such as electronic mail, various filter tools, e.g., spam filters, virus scanning and filters, whitelists, blacklists, and the like, have been developed to identify electronic mail messages that are determined to be likely unwanted or malicious. However, such mechanisms operate on the assumption that immediate access to the communication is not needed. That is, because electronic mail messaging is not assumed to be instantaneous, the filtering and scanning mechanisms can operate "behind the scenes" with delayed delivery of the electronic mail communication to the recipient while the filtering and scanning mechanisms perform their function and only providing the electronic mail message to the recipient once the filtering and scanning has been completed.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for delivering instant messages to recipient computing systems. The method comprises receiving an instant message from a source computing system for delivery to a recipient computing system and sending the instant message to the recipient computing system which displays the instant message in a dialog interface on the recipient computing system. The method further comprises executing, at substantially a same time as the instant message is sent to the recipient computing system, a lightweight initial scan and filter operation on the instant message to determine a preliminary classification of the instant message as being a first type message corresponding to a benign message, or a second type message corresponding to an unwanted or malicious message. In addition, the method comprises, in response to the preliminary classification indicating the instant message to be the second type message: (1) sending a warning notification message to the recipient computing device for displaying of the warning notification message in the dialog interface; (2) processing the instant message by an analytics pipeline to determine a final classification of the instant message as being either the first type message or the second type message; and (3) sending a command message to the recipient computing device to update the dialog interface of the recipient computing device based on the final classification of the instant message.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 2 is an example diagram of a distributed data processing system environment in which aspects of the illustrative embodiments may be implemented and at least some of the computer code involved in performing the inventive methods may be executed;

DETAILED DESCRIPTION

Figure 1:
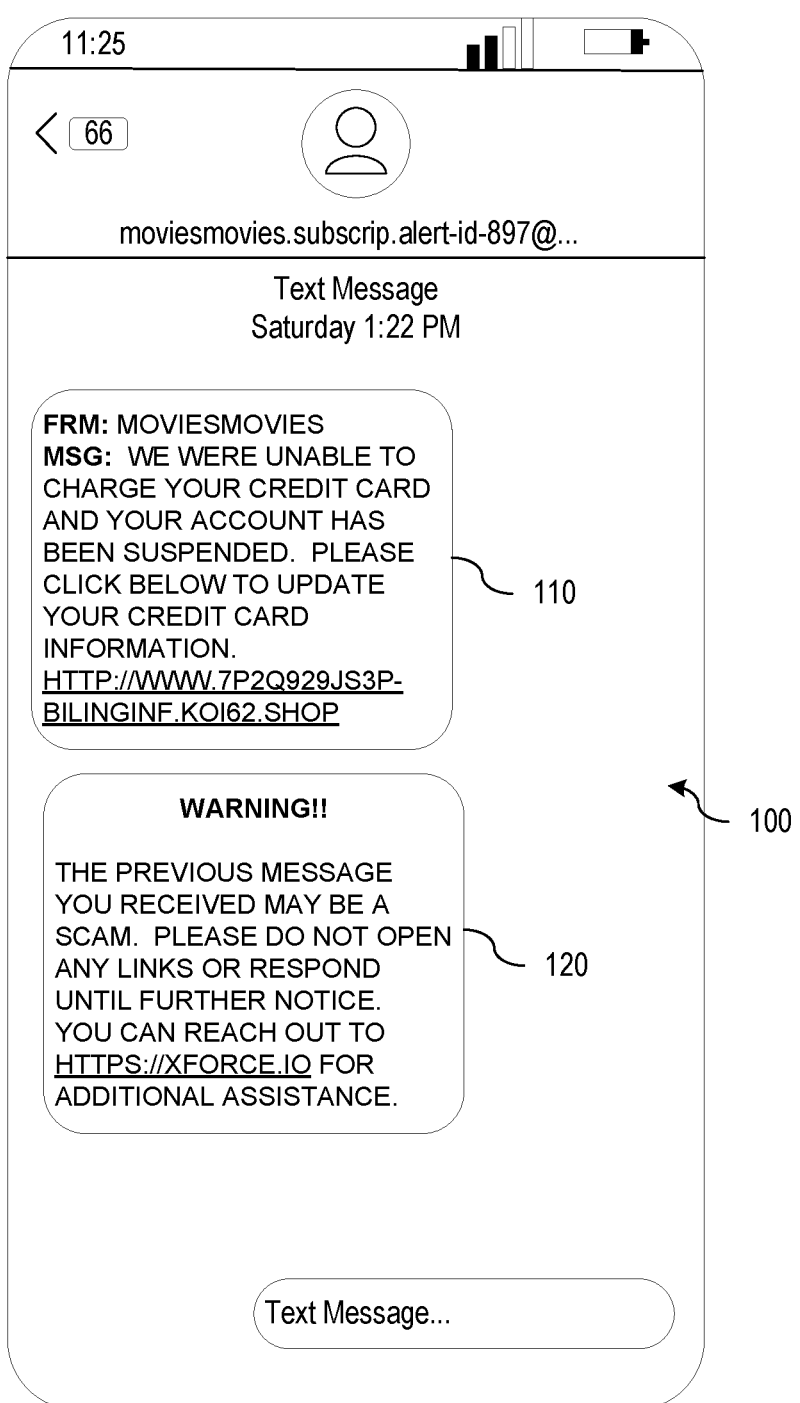
FIG. 1 is a diagram of an example dialog interface in which warning messages are injected into the dialog in accordance with one illustrative embodiment.

The illustrative embodiments provide an improved computing tool and improved computing tool operations/functionality for providing protections against unwanted messaging in instant messaging systems. As with other forms of electronic communications, such as electronic mail messages, instant messages are likewise an avenue through which modern sophisticated exploitation entities can send unwanted and even malicious communications to individuals. That is, these instant messages can exist on a spectrum of "unwantedness" from one extreme corresponding to unwanted advertising or notifications, to the other extreme of malicious and misleading instant messages eliciting a user divulging personal information and/or financial information that can be used by malicious parties. However, instant messaging mechanisms are not the same as electronic mail communications due to the expectation of the substantially instantaneous access to the instant messages without significant delay, which makes the mechanisms developed for delayed electronic communications, such as electronic mail, not able to be practically applied to instant messaging mechanisms.

Instant messaging, or Short Message Service (SMS) messaging, is a type of data communication, which is predominantly textual, but may include some images and/or short videos, through which one or more users may communicate with virtually instant delivery of the communication to the specified recipients. Recently, more and more often, unwanted, and possibly malicious, communications are being sent via instant messaging or SMS messaging mechanisms. This is a form of spamming individuals with broadcast communications that serve as a nuisance to recipients that did not wish to receive these communications, or may even serve as a possible source of victimizing of the recipients if they intentionally or unintentionally react to the communication in a way that opens them up to exploitation.

This type of spamming is increasing, yet there are no satisfactory computing tools for addressing these spam messages as the existing tools were developed for non-instant communication and thus, introduce a level of delay or latency that is contrary to the purpose of the instant messaging mechanisms, i.e., virtual immediate communication between parties. Moreover, malicious parties are increasingly sophisticated and create messages that appear to be valid when in fact they are attempting to exploit individuals. For example, a message that a person has a pending package at a package carrier, e.g., United States Postal Service (USPS)®, Federal Express (FedEx)®, or United Parcel Service (UPS)® may be received requesting that a user click on a tracking number, or a spoofing that a content provider service, e.g., Netflix®, failed to process a payment and the person needs to login to address the issue. This situation is worsening over time as more messaging applications and systems are developed and increasingly used by individuals, e.g., iMessage®, Whatsapp®, Telegram®, SameTime®, and the like.

The existing electronic mail (email) scanning and filtering mechanisms, e.g., spam filtering solutions, cannot handle instant messages because of the following reasons. The volume of instant messages is much higher than emails. That is, individuals may send hundreds of instant messages a day, and may receive a similar large volume of messages from other individuals. Existing email scanning and filtering mechanisms add additional latency to the delivery of email and is often performed at both the email server and the email client levels. Users of instant messaging mechanisms would find such delays and latencies unacceptable as it defeats the reason for using the instant messaging mechanisms in the first place, i.e., the virtually instantaneous delivery of electronic communications to recipients so as to mimic or simulate a face-to-face communication with other individuals, but via a digital communication platform. The expected performance requirements of instant messaging results in different service level agreements (SLAs) between providers and users, and these performance requirements of messaging is much higher, i.e., shorter response time and higher transaction rates, for instant messaging. Furthermore, the instant messaging systems are more centralized which requires the centralized servers to handle the delivery of the instant messages in accordance with SLAs and thus, if electronic mail scanning and filtering mechanisms were employed at these centralized servers, they would cause a significant bottleneck to the delivery of instant messages.

Therefore, the existing email spam scanning and filtering solutions cannot directly apply to instant messaging systems because none of the existing solutions can analyze every instant message and still meet the performance requirements of instant messaging systems. With email systems, unlike instant messaging, many emails can be queued up and analyzed one by one, and users will not notice the delay or the delay is generally acceptable to the users. There is a need for an improved computing tool and improved computing tool operations/functionality providing technology to analyze instant messages to identify unwanted or malicious messages, and still provide the same user experience, i.e., the same or substantially similar performance, as users expect from instant messaging systems, i.e., virtually instantaneous delivery of communications.

The illustrative embodiments provide a technological solution specific to the problem of unwanted or malicious instant messages by providing a scanning and filtering mechanism that is able to operation at the carrier/service provider level, while maintaining the expected level of performance for substantially instant delivery of messages. The solution provided by the improved computing tool and improved computing tool operations/functionality recognize that an inline inspection on every instant message cannot be performed prior to delivery of the instant message to the recipient because it would require a large, complex infrastructure and would still introduce latency into the delivery of instant messages that is unacceptable. Thus, rather than performing inline inspection on every message, the illustrative embodiments provide a new user experience to seamlessly notify users about potentially unwanted or malicious messages in the same dialog session with the user via the instant messaging application and then evaluating the message after delivery of the instant message to determine whether the message is in fact an unwanted or malicious message.

This notification can be performed with regard to messages that have matched an initial lightweight scanning and filtering operation to identify messages that are suspicious. The message is delivered to the recipient with the warning notification if appropriate, and then a full scan and filtering operation may be performed. In this way, users are made aware of the potential unwanted or malicious nature of the message before interacting with the message at the earliest time without interrupting the virtually instantaneous delivery of the message to the recipient, as users expect. The warning notification may be provided in the same dialog interface as is being used to deliver and send the instant messages as if it were part of the conversation between the parties, and preferably as close as possible to the delivered instant message to which it pertains.

This warning notification places the user on notice while more detailed analysis of the delivered instant message is being performed as a background operation. Once the background operation has completed, and determined whether the delivered instant message is indeed an unwanted or malicious message, or is a benign message, then appropriate further actions may be performed if needed, e.g., removal of warning notification in the case that the message is determined to be benign, removal of the delivered instant message if it is determined to be unwanted or malicious, reporting the source of the instant message to authorities in the case of a malicious message, or the like.

Thus, with the mechanisms of the illustrative embodiments, when users receive an instant message, a lightweight scan and filter operation is performed to determine if the message is potentially unwanted or malicious at substantially a same time as the instant message is being delivered to the user. This initial lightweight scan/filter is designed to be performed very quickly and only check a relatively small number of indicators, e.g., whether the message is from someone in the recipient's contact list stored on their computing device that is receiving the instant message, whether the message is received in response to a previous instant message sent by the user to that same source, i.e., the received instant message is responsive to a previous instant message, and the like (hereafter, the description will reference "instant messages" as simply messages for simplicity). This lightweight scan and filter operation minimizes the number of factors evaluated to allow the scan and filter to be performed with minimal delay and at substantially the same time as delivery of the message so that the virtually instantaneous message delivery expected from instant messaging applications and systems is maintained.

The warning notification may be injected into the dialog interface through which the user is receiving and sending messages as part of a conversation. The warning notification is injected as a type of follow-up message to the received and delivered message that was subject to the lightweight scan and filter operation. In this way, users know which messages are potentially unwanted or malicious and hence, can avoid interacting with the delivered message until subsequent operations are performed, e.g., automatic removal of the warning notification, automatic removal of the potentially unwanted/malicious message, or the like.

FIG. 1 is a diagram of an example dialog interface in which warning messages are injected into the dialog in accordance with one illustrative embodiment. The example dialog interface shown in FIG. 1 may be a user interface provided by an instant messaging application executing on a user's computing device, e.g., a smartphone, laptop computer, desktop computer, tablet device, vehicle mounted computing device, of the like. As shown in FIG. 1, the dialog interface 100 presents messages 110-120, which may comprise text content, hyperlinks, images, videos, graphics elements, and the like. The messages 110-120 are presented in a sequence which simulates a conversation between two or more individuals, where this sequence is based on the order of when the messages are received/sent. The messages are virtually instantly delivered once composed and a "send" element is selected to transmit or send the message to the recipient.

In the example shown in FIG. 1, a message 110 is in the instant messaging service's centralized computing systems, e.g., servers, and is operated on by the mechanisms of the illustrative embodiments which determine that this message 110 has the potential to be an unwanted or malicious message, e.g., a scam designed to get the user to interact with the message 110 and thereby provide access to personal information and/or data on the user's computing device, fool the user into divulging personal information, financial information, or the like, that can be exploited by malicious parties, or the like. For example, a lightweight scan and filter can look at the source information in the header of the message 110, contacts information on the user's computing device or otherwise associated with the user's identifier in the instant messaging service, or the like, as well as evaluate a small number of other factors such as whether the message 110 is responsive to a previous message from the user, or the like. In this depicted example, the message 110 is not responsive to any previous message sent by the user. In addition, the source header information for the message 110 indicates that the source is not recognized as matching a contact in the user's contact list. Other types of checks may also, or alternatively be made, such as checking the source against a whitelist, blacklist, or the like. The number of factors checked may be empirically determined so as to not introduced a significant latency into the presentation of a warning notification message 120 substantially at the same time or shortly subsequent to the delivery and presentation of the message 110 in the dialog interface 100 so as to present the warning notification as a next message displayed after the delivered message 110 in the dialog. That is, the presentation of the follow-up warning message 120 should be performed with a minimal delay between the presentation of the message 110 and the warning message 120, such that the user is not given substantial time to interact with the message 110 before being presented with the follow-up warning message 120. The particular time frame between presentation of the message 110 and the warning message 120 may be milliseconds, one or more seconds, or sometimes longer depending on the particular implementation.

It should be appreciated that while the illustrative embodiments will be described with regard to an initial lightweight scan and filter operation being used to determine which instant messages should have follow-up warning notification messages presented with them, and which should not, the illustrative embodiments are not limited to such. To the contrary, in some illustrative embodiments, such warning notification messages may be presented with each message displayed and may then be removed thereafter once the full scan and filter analysis is complete. In other illustrative embodiments, the warning notification message may be presented only after the full scan and filter analysis is complete. These illustrative embodiments have some drawbacks, e.g., too many warning notification messages such that they may be ignored by the user, warning notification messages not being presented in a timely manner to avoid user interaction with unwanted/malicious messages, and the like. Thus, the illustrative embodiments are described with preference to an initial lightweight scan and filter operation to avoid oversaturation of the dialogs with warning notification messages and to provide warning notification messages in a timely manner to minimize opportunities for users to interact with unwanted/malicious messages. However, it should be appreciated that these other embodiments are possible and gradations may be used in various implementations such that if delays are not as much of a concern, more checks may be performed in the initial scan and filter operation, or if oversaturation is not as much of a concern, fewer checks in the initial scan and filter operation may be performed.

As shown in FIG. 1, the received message 110 appears to be a notification from a subscription service, e.g., Movies-Movies, and is informing the user of a problem with their payment processing and requesting that the user click a link in the message 110 to rectify the problem. This is an unwanted and potentially malicious message, i.e., a scam message. By checking the header of the message 110 and comparing it to a contact list, whitelist, blacklist, or the like, associated with the user, either on the local user computing device or stored in the instant message service platform's data structures for its registered users, a quick check can be performed to determine if the source of this message is one that is recognized by the user as a known contact. In this case, the check results in the fact that this message is not from a known contact of the particular user. In addition, a relatively small number of other checks, smaller than the number of checks performed by a full scan and filter operation, as described hereafter, may be performed, such as checking to see if the message 110 is a first message within a given time period of the current time, i.e., the message 110 is not responsive to a current pervious message sent by the user.

If these checks indicate that the message is likely an unwanted or malicious message, the warning notification message 120 may be injected into the dialog presented by the dialog interface 100. The content of this warning notification message may take many different forms depending on the desired implementation, but in general will inform the user that the previously presented message may be unwanted/malicious and warning them not to interact with the message, i.e., the previous message may be a scam and do not open any links in the message. In addition, the warning notification may provide information and user selectable elements for obtaining assistance if needed, e.g., a hyperlink to a help service made available by the instant messaging service platform, i.e., the carrier/service provider.

While not shown in FIG. 1, it should be appreciated that these messages 110 and 120 are presented virtually instantaneously in accordance with the performance expected from instant messaging systems. However, having presented the received and delivered message 110 and the subsequent warning notification message 120, the instant messaging service platform performs a more complex and time/resource consuming scan and filter operation on the content and metadata, e.g., header information, associated with the message 110. That is, the service platform, in response to determining from the initial scan and filter that the message 110 is likely an unwanted/malicious message, places the message on an analysis pipeline that analyzes various aspects of the message to generate a predicted classification of the message as to whether it is a benign or unwanted/malicious message. This classification may take into account a relatively large number of factors, compared to the initial scan and filter operation, utilizing various analysis engines and trained machine learning (ML) computer models.

The pipeline scan and filter operation, comprising the plurality of analysis performed by the various engines and ML computer models of the analysis pipeline, determines whether the message 110 is indeed an unwanted/malicious message and initiates a responsive action to modify the dialog of the dialog interface 100 based on the results of this classification. In the case that the message 110 is determined to be benign, operations are performed to return the dialog to a state normally expected by the user, e.g., removing warning notification messages and updating the dialog presentation so that it appears to be a normal exchange of instant messages between the user and the sending of the message 110. In the case that the message 110 is determined to be unwanted/malicious, various responsive actions may be performed to modify the dialog presentation. For example, the message 110 may be removed from the dialog. In this case, a replacement message may be inserted informing the user that the message 110 was determined to be unwanted/malicious and has been removed. In some illustrative embodiments, rather than removing the message 110, hyperlinks or interactive elements may be disabled for that message 110 and corresponding notification output to the user in the dialog. In other illustrative embodiments, the warning notification may be updated to demonstrate that the message has been determined to be unwanted/malicious rather than suspected of being unwanted/malicious, or a subsequent message conveying this information may be presented. Moreover, in some illustrative embodiments, various markings, graphics, and the like may be applied to the message 110 and/or message 120 to demonstrate the message 110 to be unwanted/malicious and/or the message 120 having been confirmed or not confirmed.

Thus, the illustrative embodiments provide mechanisms that may be implemented at a carrier/service provider level, e.g., at an instant messaging platform level, rather than the client computing device level, for virtually instantaneously informing users of potentially unwanted/malicious instant messages and then automatically modifying the dialog of the instant messaging application rendered at the client computing device to update the dialog based on a more rigorous analysis of the message to confirm whether or not the message is indeed unwanted/malicious. It should be appreciated that while the illustrative embodiments are described with the operations of the illustrative embodiments being primarily performed at the carrier/service provider level, in other illustrative embodiments, the operations of the illustrative embodiments, or at least some of the operations, may be performed at the client computing device level, such as by an agent application executing on the client computing device. Any suitable division of the operations of the illustrative embodiments between the carrier/service provider computing systems and the client computing devices may be used without departing from the spirit and scope of the present invention.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

The present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides improved computer operations/functionality to perform an initial lightweight scan and filter, injection of warning notifications, and subsequent detailed analytic pipeline analysis and responsive operations based on a classification of messages as to whether they are benign or unwanted/malicious. The improved computing tool implements mechanism and functionality, such as protected message system, which cannot be practically performed by human beings either outside of, or with the assistance of, a technical environment, such as a mental process or the like. The improved computing tool provides a practical application of the methodology at least in that the improved computing tool is able to determine which instant messages are likely unwanted/malicious and inject a warning notification regarding such, into the dialog of an instant message conversation, and performing subsequent pipeline analysis of the message to confirm/overrule the initial determination and perform an appropriate responsive action. At least due to the volume and required virtually instant delivery of instant messages, it is not practical for the operations of the present invention to be performed manually by human beings as part of a method of organizing human activity, or mentally as a mental process.

FIG. 2 is an example diagram of a distributed data processing system environment in which aspects of the illustrative embodiments may be implemented and at least some of the computer code involved in performing the inventive methods may be executed. That is, computing environment 200 contains an example of an environment for the execution of at least some of the computer code involved in performing the inventive methods, such as protected message system 300. In addition to protected message system 300, computing environment 200 includes, for example, computer 201, wide area network (WAN) 202, end user device (EUD) 203, remote server 204, public cloud 205, and private cloud 206. In this embodiment, computer 201 includes processor set 210 (including processing circuitry 220 and cache 221), communication fabric 211, volatile memory 212, persistent storage 213 (including operating system 222 and protected message system 300, as identified above), peripheral device set 214 (including user interface (UI), device set 223, storage 224, and Internet of Things (IoT) sensor set 225), and network module 215. Remote server 204 includes remote database 230. Public cloud 205 includes gateway 240, cloud orchestration module 241, host physical machine set 242, virtual machine set 243, and container set 244.

Computer 201 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 230. As is well understood in the art of computer technology, and depending upon the technology, performance of a computer-implemented method may be distributed among multiple computers and/or between multiple locations. On the other hand, in this presentation of computing environment 200, detailed discussion is focused on a single computer, specifically computer 201, to keep the presentation as simple as possible. Computer 201 may be located in a cloud, even though it is not shown in a cloud in FIG. 2. On the other hand, computer 201 is not required to be in a cloud except to any extent as may be affirmatively indicated.

Processor set 210 includes one, or more, computer processors of any type now known or to be developed in the future. Processing circuitry 220 may be distributed over multiple packages, for example, multiple, coordinated integrated circuit chips. Processing circuitry 220 may implement multiple processor threads and/or multiple processor cores. Cache 221 is memory that is located in the processor chip package(s) and is typically used for data or code that should be available for rapid access by the threads or cores running on processor set 210. Cache memories are typically organized into multiple levels depending upon relative proximity to the processing circuitry. Alternatively, some, or all, of the cache for the processor set may be located "off chip." In some computing environments, processor set 210 may be designed for working with qubits and performing quantum computing.

Computer readable program instructions are typically loaded onto computer 201 to cause a series of operational steps to be performed by processor set 210 of computer 201 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 221 and the other storage media discussed below. The program instructions, and associated data, are accessed by processor set 210 to control and direct performance of the inventive methods. In computing environment 200, at least some of the instructions for performing the inventive methods may be stored in protected message system 300 in persistent storage 213.

Communication fabric 211 is the signal conduction paths that allow the various components of computer 201 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 212 is any type of volatile memory now known or to be developed in the future. Examples include dynamic type random access memory (RAM) or static type RAM. Typically, the volatile memory is characterized by random access, but this is not required unless affirmatively indicated. In computer 201, the volatile memory 212 is located in a single package and is internal to computer 201, but, alternatively or additionally, the volatile memory may be distributed over multiple packages and/or located externally with respect to computer 201.

Persistent storage 213 is any form of non-volatile storage for computers that is now known or to be developed in the future. The non-volatility of this storage means that the stored data is maintained regardless of whether power is being supplied to computer 201 and/or directly to persistent storage 213. Persistent storage 213 may be a read only memory (ROM), but typically at least a portion of the persistent storage allows writing of data, deletion of data and re-writing of data. Some familiar forms of persistent storage include magnetic disks and solid state storage devices. Operating system 222 may take several forms, such as various known proprietary operating systems or open source Portable Operating System Interface type operating systems that employ a kernel. The code included in protected message system 300 typically includes at least some of the computer code involved in performing the inventive methods.

Peripheral device set 214 includes the set of peripheral devices of computer 201. Data communication connections between the peripheral devices and the other components of computer 201 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 223 may include components such as a display screen, speaker, microphone, wearable devices (such as goggles and smart watches), keyboard, mouse, printer, touchpad, game controllers, and haptic devices. Storage 224 is external storage, such as an external hard drive, or insertable storage, such as an SD card. Storage 224 may be persistent and/or volatile. In some embodiments, storage 224 may take the form of a quantum computing storage device for storing data in the form of qubits. In embodiments where computer 201 is required to have a large amount of storage (for example, where computer 201 locally stores and manages a large database) then this storage may be provided by peripheral storage devices designed for storing very large amounts of data, such as a storage area network (SAN) that is shared by multiple, geographically distributed computers. IoT sensor set 225 is made up of sensors that can be used in Internet of Things applications. For example, one sensor may be a thermometer and another sensor may be a motion detector.

Network module 215 is the collection of computer software, hardware, and firmware that allows computer 201 to communicate with other computers through WAN 202. Network module 215 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 215 are performed on the same physical hardware device. In other embodiments (for example, embodiments that utilize software-defined networking (SDN)), the control functions and the forwarding functions of network module 215 are performed on physically separate devices, such that the control functions manage several different network hardware devices. Computer readable program instructions for performing the inventive methods can typically be downloaded to computer 201 from an external computer or external storage device through a network adapter card or network interface included in network module 215.

WAN 202 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 203 is any computer system that is used and controlled by an end user (for example, a customer of an enterprise that operates computer 201), and may take any of the forms discussed above in connection with computer 201. EUD 203 typically receives helpful and useful data from the operations of computer 201. For example, in a hypothetical case where computer 201 is designed to provide a recommendation to an end user, this recommendation would typically be communicated from network module 215 of computer 201 through WAN 202 to EUD 203. In this way, EUD 203 can display, or otherwise present, the recommendation to an end user. In some embodiments, EUD 203 may be a client device, such as thin client, heavy client, mainframe computer, desktop computer and so on.

Remote server 204 is any computer system that serves at least some data and/or functionality to computer 201. Remote server 204 may be controlled and used by the same entity that operates computer 201. Remote server 204 represents the machine(s) that collect and store helpful and useful data for use by other computers, such as computer 201. For example, in a hypothetical case where computer 201 is designed and programmed to provide a recommendation based on historical data, then this historical data may be provided to computer 201 from remote database 230 of remote server 204.

Public cloud 205 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 205 is performed by the computer hardware and/or software of cloud orchestration module 241. The computing resources provided by public cloud 205 are typically implemented by virtual computing environments that run on various computers making up the computers of host physical machine set 242, which is the universe of physical computers in and/or available to public cloud 205. The virtual computing environments (VCEs) typically take the form of virtual machines from virtual machine set 243 and/or containers from container set 244. It is understood that these VCEs may be stored as images and may be transferred among and between the various physical machine hosts, either as images or after instantiation of the VCE. Cloud orchestration module 241 manages the transfer and storage of images, deploys new instantiations of VCEs and manages active instantiations of VCE deployments. Gateway 240 is the collection of computer software, hardware, and firmware that allows public cloud 205 to communicate through WAN 202.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 206 is similar to public cloud 205, except that the computing resources are only available for use by a single enterprise. While private cloud 206 is depicted as being in communication with WAN 202, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 205 and private cloud 206 are both part of a larger hybrid cloud.

As shown in FIG. 2, one or more of the computing devices, e.g., computer 201 or remote server 204, may be specifically configured to implement a protected message system 300. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as computer 201 or remote server 204, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates virtually instantaneous or substantially instantaneous scanning and filtering of instant messages so as to remove or disable messages determined to be potentially unwanted or malicious.

Figure 3:
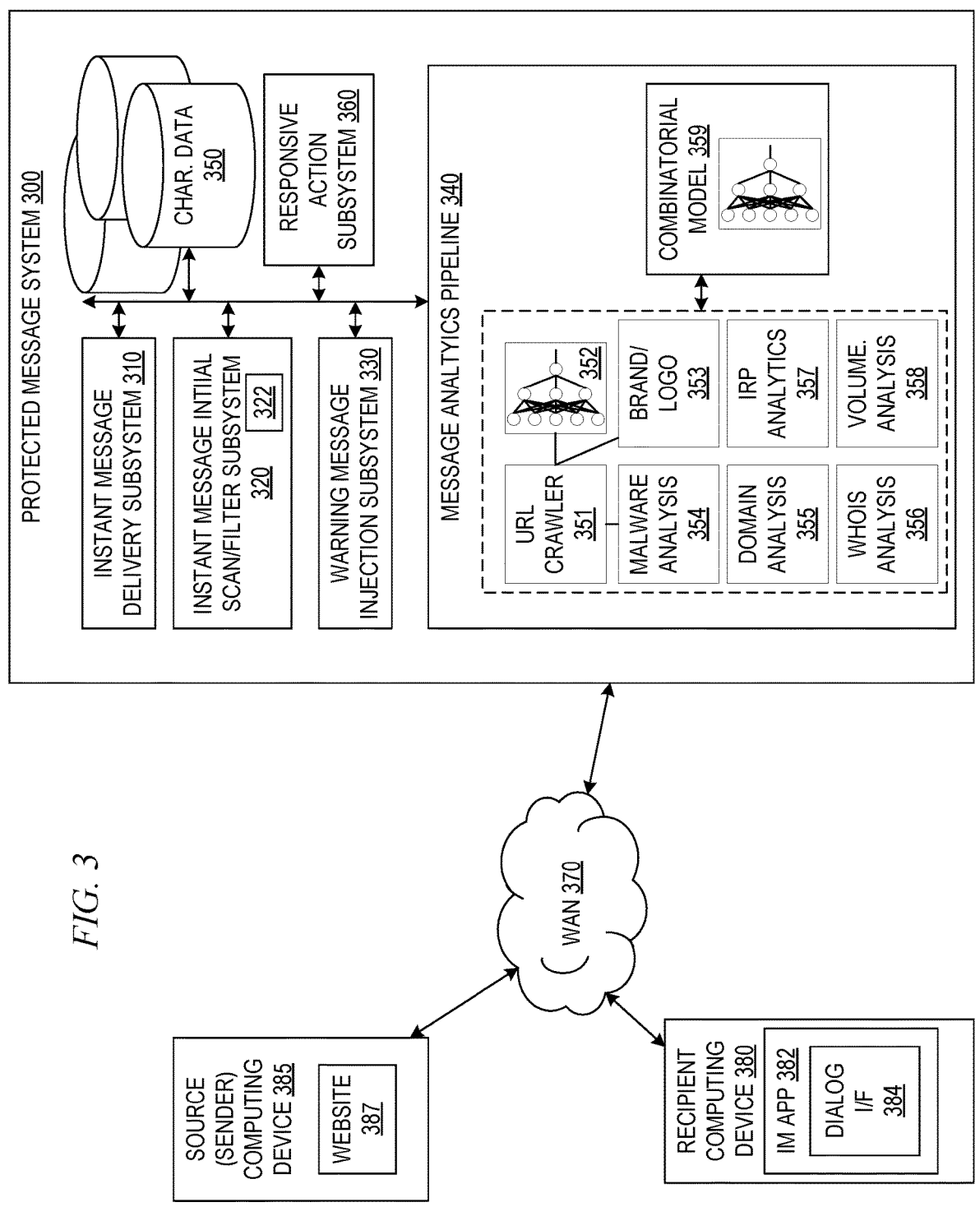
FIG. 3 is an example diagram of the primary operational components of message protection system in accordance with one illustrative embodiment.

FIG. 3 is an example block diagram illustrating the primary operational components of a protected message system in accordance with one illustrative embodiment. The operational components shown in FIG. 3 may be implemented as dedicated computer hardware components, computer software executing on computer hardware which is then configured to perform the specific computer operations attributed to that component, or any combination of dedicated computer hardware and computer software configured computer hardware. It should be appreciated that these operational components perform the attributed operations automatically, without human intervention, even though inputs may be provided by human beings and the resulting output may aid human beings. The invention is specifically directed to the automatically operating computer components directed to improving the way that instant messages are delivered and made available to recipients in a way that protects recipients from unwanted and/or malicious instant messages. The illustrative embodiments provide specific automated mechanisms for performing initial scanning and filtering, injection of warning notifications into dialogs, and subsequent analytic pipeline analysis of messages and performance of responsive actions, which cannot be practically performed by human beings as a mental process and is not directed to organizing any human activity.

As shown in FIG. 3, the protected message system 300 includes an instant message delivery subsystem 310, an instant message initial scan/filter subsystem 320, a warning message injection subsystem 330, a message analytics pipeline 340, one or more unwanted/malicious message characteristics data structures 350, and a responsive action subsystem 360. The analytics pipeline 340 comprises one or more analytics engines 351-358 which may each be configured to analyze different aspects and factors of instant messages that may be indicative of the message being unwanted and/or malicious. Some of these analytics engines 351-358 may implement trained machine learning computer models that are trained through machine learning processes, on training data samples of messages and ground truth label classifications of the messages as being benign or unwanted/malicious, to perform classifications of the messages based on the corresponding aspects of the messages. The combination of these various classifications may then be combined through a combinatorial machine learning (ML) computer model 359 which generates a final classification of the pipeline 340 as to whether a particular message is benign or an unwanted/malicious message.

With the mechanisms of the illustrative embodiments, the protected message system 300 may be implemented as part of an instant message platform at the carrier/service provider level. As such, the protected message system 300 may be implemented in one or more server computing systems of the carrier/service provider which may then transmit or send instant messages to client computing devices via one or more wired/wireless data communication networks. The instant message initial scan/filter subsystem 320 of the protected message system 300 may perform an initial scan of a received instant message, such as an instant message sent by a source or sender computing device 385, for example, to perform a preliminary evaluation of whether or not the instant message is possibly an unwanted or malicious message. The instant message scan/filter subsystem 320 may extract a specific subset of information and evaluate it against a small subset of filter rules, potentially based on one or more contacts data structures or the like, specific to the intended recipient of the instant message. This initial scan/filter operation of the subsystem 320 may be performed while the instant message is being processed in accordance with known mechanisms for delivering instant messages to recipients via instant messaging services, e.g., recipient computing device 380 in FIG. 3.

For example, the initial scan/filter operation of the subsystem 320 may be a lightweight scan and filter operation designed to be performed very quickly and only check a relatively small number of indicators in the metadata or headers of the instant message. As one non-limiting example, the initial scan/filter operation may comprise extracting the source information from the message metadata or header and comparing it to a contact list associated with the recipient, as may be maintained by the instant message initial scan/filter subsystem 320, such as in recipient resources storage 322, to determine whether the message is from someone in the recipient's contact list or not. Messages sent from sources that are not in the recipients contact list are more likely to be unwanted or malicious messages than messages from sources that are in the recipient's contact list.

One, or a small number, of other factors or indicators may also be checked so as to reduce the number of messages that are determined to be potentially unwanted or malicious, and thus, reduce the likelihood that warning notifications will be found to be nuisances and are in fact associated with suspicious messages. For example, a determination may be made as to whether the message is the first message of a dialog session with the recipient in a particular period of time. If the message is the first message in a dialog session, it is more likely to be an unwanted or malicious message. Moreover, the protected message system 300 may maintain a listing of previous sources of messages that were found to be unwanted or malicious in a type of blacklist data structure and an initial matching with this blacklist data structure may be performed. As another example, the initial scan/filter operation may determine whether the message is received in response to a previous instant message sent by the user to that same source or if the user has, in a previous dialog session, responded to the sender without incident, e.g., the protected message system may maintain a type of whitelist data structure against which the initial scan/filter can perform a comparison. Matches to the blacklist indicate unwanted/malicious messages while matches to the whitelist indicate benign messages.

The number of factors/indicators evaluated and which factors/indicators to evaluate will be dependent upon the particular implementation and will preferably be selected so as to not add an appreciable delay or latency to the presentation of a warning notification message virtually immediately after the received message is delivered to the recipient, and thereby minimize the amount of time the user of the recipient device has to possibly interact with the delivered message before being notified of its potential unwanted/malicious nature. Thus, the lightweight initial scan/filter operation minimizes the number of factors evaluated to allow the scan and filter to be performed with minimal delay and at substantially the same time as delivery of the message so that the virtually instantaneous message delivery expected from instant messaging applications and systems is maintained.

Thus, when an instant message, such as may be sent by source (or sender) computing device 385 via the WAN 370, is received by the carrier/instant message service provider computing systems, which implement the protected message system 300 of the illustrative embodiments, the instant message delivery subsystem 310 delivers the instant message to the specified recipient in a manner generally known in the art. However, in addition, and at substantially a same time, the instant message is also scanned/filtered by the instant message initial scan/filter subsystem 320 to make a preliminary determination as to whether the instant message is likely to be unwanted or malicious. This lightweight initial scan/filter subsystem 320 may make use of one or more data structures that against which extracted indicators/factors from the metadata or header information of the instant message may be compared to make the initial determination. These data structures may be specific to the particular recipient specified in the instant message, e.g., a recipient computing device 380 or a user of such a recipient computing device 380, such that different data structures may be maintained by the protected message system 300 for different recipients. Thus, not only does the protected message system 300 determine whether messages are unwanted/malicious in a general sense based on criteria established for all or at least a plurality of recipients, but also can perform customized specific determinations of unwanted/malicious messages on an individual recipient level.

For those messages that are determined by the initial scan/filter subsystem 320 to be likely unwanted/malicious, the warning message injection subsystem 330 injects into the dialog session between the source and the recipient, in a dialog interface 384 which may be provided by an instant messaging application, agent, or the like 382, a warning notification message that is displayed in the same dialog interface 384 as the delivered message, substantially immediately following the delivered message. The warning notification is injected as a type of follow-up message to the received and delivered message that was subject to the lightweight scan and filter operation.

The warning notification message content informs the user that the previously delivered instant message may be unwanted/malicious and that the user of the computing device viewing the dialog interface in which these messages are presented should not interact with the previously delivered message until the message has been verified, i.e., the user should not click on any hyperlinks or otherwise respond to the message. In this way, users know which messages are potentially unwanted or malicious and hence, can avoid interacting with the delivered message until subsequent operations are performed, e.g., automatic removal of the warning notification, automatic removal of the potentially unwanted/malicious message, or the like, based on a more detailed and extensive analysis of the previously delivered instant message.

In some illustrative embodiments, the warning message injection subsystem 330 may further operate to disable and/or obscure any user interactable elements of the previously delivered message in the dialog interface 384, e.g., disable the hyperlinks from being clickable or the like. These actions may be triggered on the recipient computing device 380 in response to the warning notification message being received from the protected message system 300, i.e., the instant messaging application, agent, or the like 382 executing on the user's computing device (client computing device) and through which the dialog interface 384 is presented, may have logic that responds to these warning notification messages such that they trigger responsive actions by the recipient computing device 380, such as disabling the hyperlinks, obscuring the content, or a portion thereof, of the previously received message, or the like.

In some illustrative embodiments, the warning message injection subsystem 330 may generate unique identifiers for warning notifications so that future data correlation operations may be performed. For example, a unique Uniform Resource Locator (URL) or other identifier may be generated that links to, or contains the threat information for, later analysis by cybersecurity tools, e.g., IBM X-Force or IBM X-Force Exchange threat intelligence tools, available from International Business Machines (IBM) Corporation of Armonk, New York.

Thus, users are made aware of the potential unwanted or malicious nature of the message before interacting with the message at the earliest time without interrupting the virtually instantaneous delivery of the message to the recipient, as users expect. Furthermore, since the warning notification may be provided in the same dialog interface 384 as is being used to deliver and send the instant messages, as if it were part of the conversation between the parties, and preferably as close as possible to the delivered instant message to which it pertains, the user's attention is immediately directed to the warning notification message when the user is viewing the dialog and determining whether to respond or interact with the previously delivered instant message.

At substantially a same time as the warning notification message is being presented in the same dialog interface as the previously delivered message, the previously delivered message is also provided to the message analytics pipeline 340 for a full scan and filtering analysis. It should be appreciated that the analysis of the message analytics pipeline 340 may be similar to the initial scan/filter operation of the instant message initial scan/filter subsystem 320, but will take into account a larger number of indicators/factors, and may utilize more complex analysis mechanisms, such as machine learning computer models, large rule sets, and the like, to determine whether the instant message that was received and delivered to the recipient is in fact an unwanted/malicious message. The message analytics pipeline 340 may utilize one or more unwanted/malicious message characteristics data structures 350, which may be general for all or at least a plurality of recipients of instant messages and/or customized to individual recipients, similar to the data structures used by the initial scan/filter subsystem 320. Where the initial scan/filter subsystem 320 is designed to have minimal delay or latency so as to present warning notification messages substantially immediately after delivery of the instant message to the recipient computing device 380, the full scan/filter operation of the message analytics pipeline 340 is focused on performing a more detailed analysis to determine an accurate classification of the message as either benign or unwanted/malicious and may have more latency than the initial scan/filter subsystem due to the larger number of factors/indicators evaluated and the more advanced tools implemented as part of the message analytics pipeline 340.

As noted above, the message analytics pipeline 340 comprises one or more analytics engines 351-358 which may operate to extract features from the delivered instant message and evaluate them against one or more unwanted/ malicious message characteristics data structures 350 as well as perform other analytics based on the extracted features. Some of these analytics engines 351-358 may interact with other sources of information, e.g., databases and the like, that are external to the protected message system 300 and/or the carrier/instant message service provider, to perform their operations. In some cases, one or more of the analytics engines 351-358 may implement machine learning trained computer models to perform artificial intelligence (AI) analysis of the extracted features to determine a likely classification of the delivered instant message, e.g., with regard to classes of benign or unwanted/malicious. These machine learning computer models are trained through machine learning processes specifically on curated training data sets comprising training instant messages and their metadata/header information. For the sample messages in the training data sets, ground truth labels are provided that indicate whether the message is in fact a benign message or an unwanted/malicious message.

A feature extraction engine (not shown) may extract features from the sample message and input a subset of the features specific to the machine learning computer model into the machine learning computer model, e.g., one machine learning computer model may operate on input features including the source of the message, the recipient of the message, and an indicator of whether the message is a first message in a dialog session or not, while another machine learning computer model may extract a URL from the message and use the URL to gather information about the website, e.g., website 387, associated with the URL which is then input to the machine learning computer model and analyzed.

The machine learning computer model operates on the inputs to generate a classification output that classifies the inputs as to a plurality of predetermined classifications. In some illustrative embodiments, the classification may be a binary classification of whether the inputs indicate the sample message to be benign or unwanted/malicious. In other illustrative embodiments, a plurality of classes greater than two may be utilized, with each classification getting a classification score based on the operation of the machine learning computer model on the inputs, and where this classification score may be within a given range, e.g., from 0.0 to 1.0. The classification score indicates a likelihood that the corresponding classification applies to the sample message, with 1.0 being an indication that the corresponding class is the correct class for the sample message, 0.0 being an indication that the corresponding class is not the correct class for the sample message, and values between 0.0 and 1.0 indicating a probability or likelihood that the corresponding classification applies to the sample message.

The machine learning computer model operates on the inputs extracted from the sample message, and/or obtained from other sources based on features extracted from the sample message, e.g., website 387 information based on a URL in the message, and determines a classification output. The classification output is compared to the ground truth label for that sample message and an error or loss is determined based on the differences determined from the comparison. A machine learning training algorithm, such as a linear regression or the like, is applied to the error or loss to determine appropriate modifications of operational parameters of the machine learning computer model to make to thereby modify the operation of the machine learning computer model in an attempt to reduce the error or loss and thereby improve the accuracy of the output classification generated by the machine learning computer model. In some cases, the particular features and operational parameters that contributed the most to the output classification generated by the machine learning computer model may be determined and the weights associated with nodes in the machine learning computer model that evaluated such features or parameters may be modified based on the machine learning training algorithm. This process is repeated over multiple training sample messages in the training datasets until a convergence criteria is met, e.g., the error or loss is equal to or less than a predetermined threshold, or a predetermined maximum number of iterations, or epochs, have been executed. Once the convergence criteria is satisfied, the machine learning computer model is considered to be a trained machine learning computer model and can be deployed for performance of analytics in the message analytics pipeline 340.

It should be noted that while the various analytics engines 351-358 may be implemented as trained machine learning computer models that are specifically trained to analyze particular subsets of features extracted from input instant messages, or information obtained from external sources based on features extracted from input message, some of the analytics engines 351-358 may instead be implemented as rules engines that apply predetermined sets of analytical rules to the inputs to determine if criteria of the rules are satisfied and then performing a corresponding action, e.g., outputting a particular output classification, or may be predefined algorithms that execute on the inputs to generate such output classifications. Essentially, each of the analytics engines 351-358 perform analytics operations on the inputs to determine, from the viewpoint of that particular analytic engine, whether the input instant message should be classified as benign or unwanted/malicious, or in other cases where more classifications are used, a probability for each of the predefined classes.

As shown in FIG. 3, as non-limiting examples of the analytics engines that may be employed in the analytics pipeline 340, one of the analytics engines 351-358 may be a URL crawler 351. The URL crawler 351 operates to access a target URL specified in the content of the input instant message and navigate, or crawl through, the web pages automatically to determine an architecture or organization of the web pages. This architecture or organization of the web pages may be indicative of whether or not the instant message is likely an unwanted/malicious message. For example, in crawling the web pages, the URL crawler 351 may extract and maintain information about the various web pages, including information about descriptions, images, Document Object Model (DOM) structure, and the like, which may be used by other analytics engines 351-358 to perform their classifications as well. For example, the DOM structure can be analyzed to determine if it is hosted by a phishing kit, logos on the website 387 may be analyzed to see if the website 387 is mimicking a legitimate website, and the domain name may be analyzed to determine if it is a known phishing domain.

For example, another analytics engine 352 may be a URL classifier engine. The URL classifier engine 352 may operate on the information collected by the URL crawler 351 to classify the website 387 accessed from the URL specified in the instant message as to whether it is an unwanted/malicious website and thus, is indicative of the instant message being an unwanted/malicious instant message. For example, the URL classifier 352 may take the descriptions, images, DOM structure, and the like, obtained by the URL crawler 351 and execute analytics, a machine learning computer model, or the like on this input to classify the instant message as to whether it is benign or unwanted/malicious.

Another example analytics engine 351-358 that may be implemented in the analytics pipeline is a brand/logo analytics engine 353. The brand/logo analytics engine 353 may operate to analyze images in the instant message and/or websites accessed from URLs inserted into the instant message, to identify brands/logos using computer vision and/or image recognition operations, involving one or more machine learning computer models specifically trained to identify brand/logo images. For example, if an instant message, or connected website, contains an image that is a brand/logo image, but that brand/logo is not recognized, it may be more likely that the instant message is an unwanted/malicious message, i.e., a message spoofing the brand/logo of a legitimate entity or is from an entity that is not recognized as a legitimate entity. The instant message may be classified as benign or unwanted/malicious based on this brand/logo analysis.

As another example, the analytics engines 351-358 may include a malware analytics engine 354. The malware analytics engine 354 may operate to retrieve the files on the website as accessed by the URL crawler 351 and analyze the riles to determine if they are potentially malicious malware using malware protection mechanisms. If malware is detected, then it is more likely that the instant message is an unwanted/malicious message.

Still a further analytics engine 351-358 that may be provided as part of the pipeline 340 may be a domain analytics engine 355. The domain analytics engine 355 operates to analyze the domain using a domain generation algorithm (DGA) and squatting analysis. DGA is a program that generates domain names using a random sequence of characters, time-based elements, dictionary words, or hard-coding. The domain analytics engine 355 may determine if the instant message source information is more or less likely to have been generated using DGA or not. If DGA is being sued, it is more likely to be an unwanted/malicious message. Similarly, a squatting analysis may be performed to determine if the IP address of the source of the instant message is in a block of IP addresses, i.e., a squat space. If the instant message is from a source associated with a squat space, it is more likely that the instant message is an unwanted/malicious message.

As another example analytics engine 351-358, a WHOIS analytics engine 356 may be utilized. WHOIS is a query and response protocol that is used for querying databases that store an Internet resource's registered users or assignees, i.e., "who is" the owner of an IP address or URL. Based on the WHOIS analysis, a determination can be made as to whether the owner of the IP address corresponding to the source, or the URL in the instant message (if any) is an entity that is known to be malicious or unwanted. As such, the instant message may be classified as benign or unwanted/malicious based on the WHOIS analysis that determines whether the domain identifies a malicious domain or not.

In yet another example, the analytics engines 351-358 may include an incident response platform (IRP) analytics engine 357. IRP mechanisms operate to analyze IP addresses of hosted websites to identify malicious websites. The IRP mechanisms may maintain listings of malicious websites and this information may be leveraged when evaluating the sources of instant messages. The IRP analytics engine 357 may access IRP data structures and resources to determine if the source of an instant message has been recognized to be a malicious source based on previous IRP operations.

As another example, the analytics engines 351-358 may further include a volumetric analytics engine 358. The volumetric analytics engine 358 leverages the historical context of messages determined to be unwanted/malicious, such as the number of message from the same sender, the user feedback, the number of unique messages by a particular sender, etc., to identify patterns indicative of whether the current instant message from the sender or source, is likely suspicious/malicious and thus, the instant message is an unwanted/malicious message. That is, for example, messages from a source (or sender) that sends a large number of messages in a broadcast manner may be more indicative of an unwanted/malicious message. Moreover, messages from a source (or sender) that does not send unique messages is more indicative of an unwanted/malicious message. Furthermore, previous user responses to messages from the same source (or sender), such as deleting the message without responding, or the like, may be indicative of the current message from the same source being more likely an unwanted/malicious message.

It should be appreciated that these are only examples of analytics engines that may be implemented in the analytics pipeline 340. Other types of analysis and other analytics engines may be used in addition to, or in replacement of, the analytics engines 351-358 described above, without departing from the spirit and scope of the present invention. In some illustrative embodiments, further analysis of the actual content of the instant message may be implemented, e.g., natural language processing analysis of the sentences in the content of the instant message may be performed to determine what the instant message is stating, e.g., the concepts discussed (e.g., financial accounts, credit cards, memberships, subscriptions, etc.) to determine if the concepts are those that are often referenced by unwanted/malicious messages, whether the instant message is requesting a responsive action from the recipient, and the like. Various semantic and syntactic analysis may be performed on the content of the instant message to determine a classification of the instant message as benign or unwanted/malicious based on the content of the instant message itself.

The analytics engines 351-358 generate output classifications for the input message based on their individual analysis of subsets of features extracted from, or obtained based on, the instant message and/or its metadata/header information. These classifications, in some illustrative embodiments, may be input to a combinatorial machine learning computer model 359 which combines the separate classifications to generate a final classification. Similar to the other machine learning models described above, this combinatorial machine learning model 359 may be trained through machine learning processes to learn how to weight the various outputs from the analytics engines 351-358, which are the inputs to the combinatorial machine learning model 359, to generate a final output classification as to whether the instant message is a benign or unwanted/malicious message. Thus, the outputs from the various analytics engines 351-358 may be weighted differently by the combinatorial machine learning model 359 such that some analytics are weighted more highly or less highly than others. The combinatorial machine learning model 359, based on the weightings, generates a final classification. In other illustrative embodiments, the combinatorial machine learning model 359 may be replaced with other combinatorial logic, such as logic that takes an average of the outputs from the analytics engines 351-358, logic that determines a majority vote of the outputs of the analytics engines 351-358, or any other logic for combining the outputs of the analytics engines 351-358 and determining a final classification output as to whether the instant message is a benign message or an unwanted/malicious message.

Based on the classification of the instant message as to being benign or an unwanted/malicious message by the message analytics pipeline 340, e.g., the output of the combinatorial logic or machine learning computer model 359, then the responsive action subsystem 360 performs a responsive action. For a benign message, a control message may be sent to the recipient computing device 380 to instruct the instant messaging application, agent, or the like, to remove the warning notification message from the dialog interface 384 and enable any elements of the previously delivered instant message, i.e., the message is benign and thus, the user should be able to interact with it. In some cases, a graphical indicator or other notification may be displayed in the dialog interface 384 to indicate to the user of the computing device that the previously received instant message was checked and passed the checks such that it was determined to be benign.

In the case of the message being classified as an unwanted/malicious message, various responsive actions may be performed to protect the user of the recipient computing device 380 from intentionally or unintentionally interacting with the previously delivered instant message and opening themselves up to exploitation. For example, hyperlinks and/or other elements of the instant message that are user interactable may be disabled and a graphical indicator or other indicator may be associated with the previously delivered instant message to clearly convey that the instant message is a malicious or unwanted message. In other cases, the delivered instant message may be deleted from the dialog interface 384 along with the warning notification message. In other cases, the instant message may be deleted and replaced with a replacement message indicating that the previously delivered instant message has been deleted because it was determined to be unwanted/malicious. In some cases, a message may be generated and injected into the dialog interface 384 to provide a user selectable operation to start an incident response and/or initiate a live chat with a security analyst to further evaluate the instant message and handle any potential threats. Various other responsive actions may be provided depending on the desired implementation and are intended to be within the spirit and scope of the present invention.

It should be appreciated that the protected message system 300 of the illustrative embodiments differs from electronic mail spam filters and the like in significant ways due to the requirement that instant messages be delivered to recipients virtually instantaneously when they are sent by the sender or source. Of course, a primary difference is that the instant message is delivered to the recipient virtually instantaneously when the instant message is sent, and this is not delayed by the need to perform any spam analysis and filtering. To the contrary, an initial scan/filter is performed to determine whether to send out a warning notification or not at substantially a same time as the instant message is delivered. Electronic mail spam filters introduce a significant delay in the delivery of electronic messages which is not acceptable in instant messaging platforms.

In addition, the illustrative embodiments provide warning notification messages that are injected into the same dialog as the instant message that is potentially unwanted/malicious. In this way, the user is made aware of which messages in particular are potentially unwanted/malicious when they are viewing the dialog interface 384 and the potentially unwanted/malicious message, i.e., the warning and the potentially unwanted/malicious message may be viewed at the same time in the The warning notification places the user on notice while more detailed analysis of the delivered instant message is being performed as a background operation. Once the background pipeline 340 analysis operations are completed, and it is determined whether the delivered instant message is indeed an unwanted or malicious message, or is a benign message, then appropriate further actions are performed if needed, e.g., removal of warning notification in the case that the message is determined to be benign, removal of the delivered instant message if it is determined to be unwanted or malicious, reporting the source of the instant message to authorities in the case of a malicious message, or the like.

Figure 4:
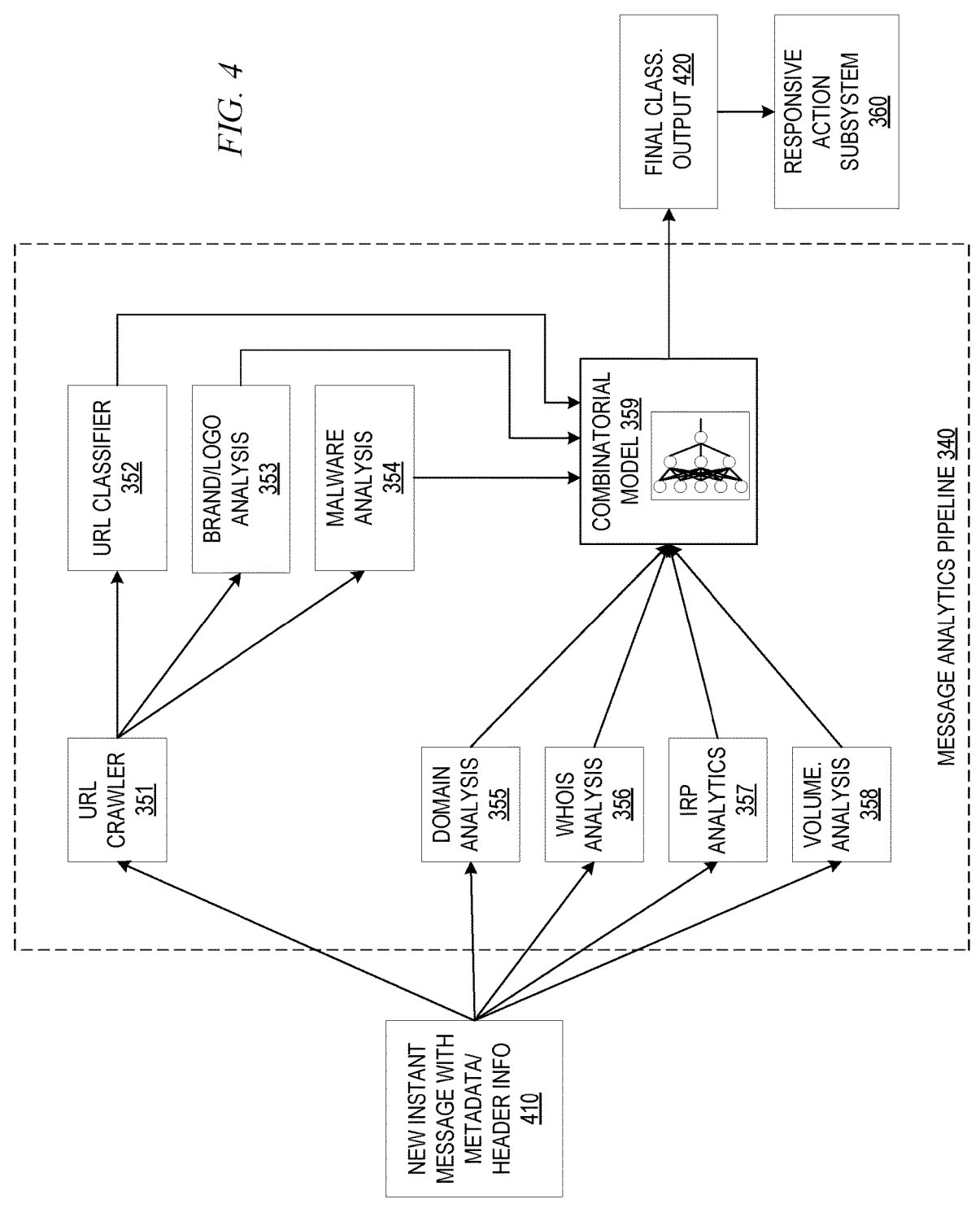
FIG. 4 is an example diagram illustrating an analytic pipeline analysis of a message in accordance with one illustrative embodiment.

As noted above, the analytic pipeline 340, in some illustrative embodiments, employs a plurality of analytics engines 351-358. FIG. 4 is an example diagram illustrating an analytic pipeline analysis of a message in accordance with one illustrative embodiment involving such a plurality of analytics engines 351-358. As shown in FIG. 4, the message analytics pipeline 340 receives a new instant message 410, which has already been delivered to the recipient computing device 380 in accordance with the operation of the instant message delivery subsystem 310 of the protected message system 300. As shown in FIG. 4, the instant message may be provided to a subset of analytics engines 351, 355-358 that are able to operate on the features extracted from the instant message and/or its metadata/header information directly. Other analytics engines, e.g., analytics engines 352-354 operate based on features and/or outputs generated from one or more of the other analytics engines. For example, in the depicted example, the URL crawler 351 may, as part of its operation, crawl the website associated with a URL and extract features and content from the website for further analysis by the analytics engines 352-354. Others of the analytics engines 351, 355-358 may operate at substantially the same time in parallel to generate classification outputs based on their individual analyses. Similarly, the analytic engines 352-354 may operate in parallel and at substantially a same time to each other.

The classification outputs generated by the plurality of analytics engines 352-358 may be input to a combinatorial machine learning computer model 359 that generates a final classification of the input message 410 as to whether it is a benign message or an unwanted/malicious message. This final classification output 420 is provided to the responsive action subsystem 360 for performance of any suitable responsive action based on the final classification.

Figure 5:
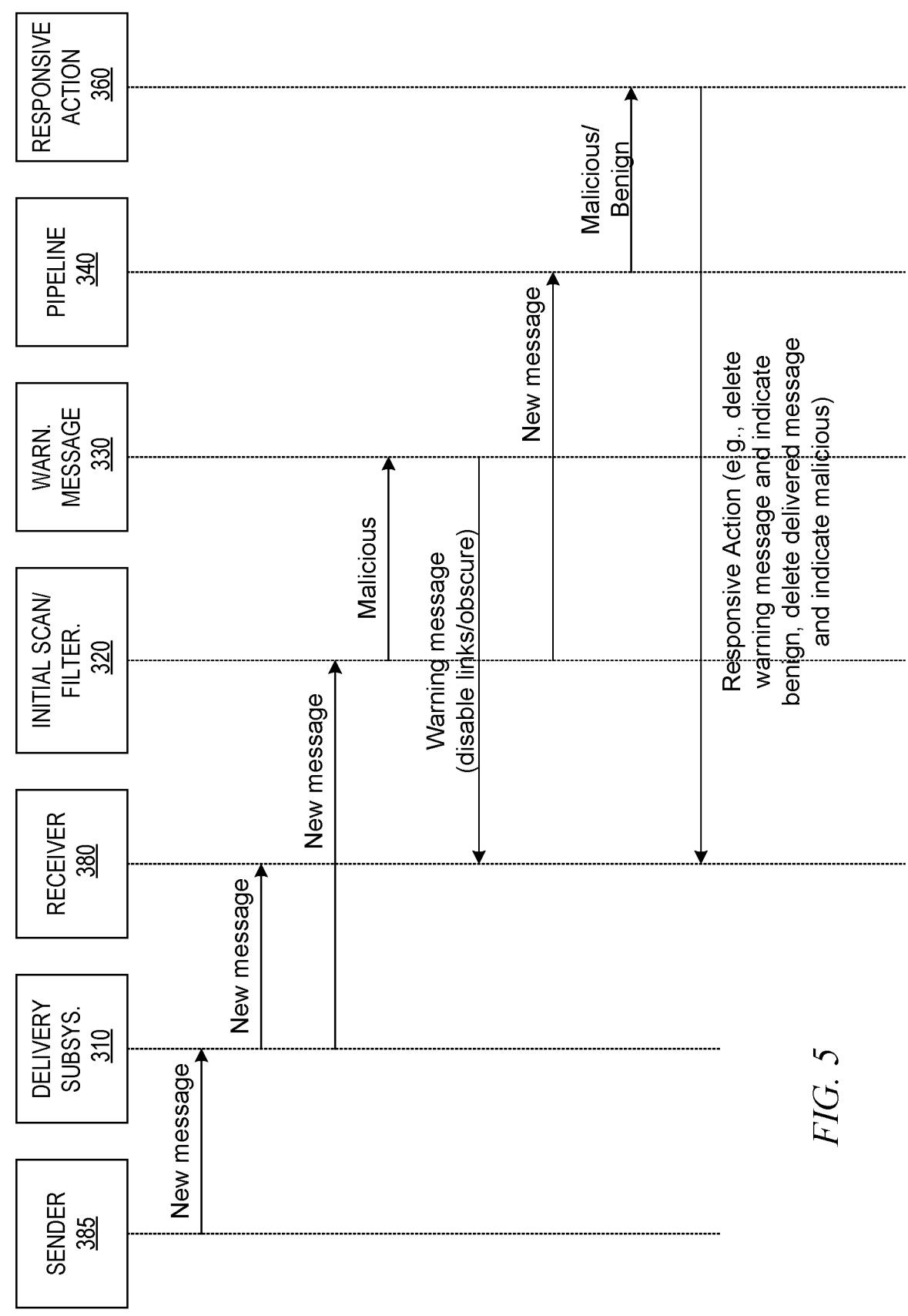
FIG. 5 is an example sequence diagram of a message protection system in accordance with one illustrative embodiment.

FIG. 5 is an example sequence diagram of a message protection system in accordance with one illustrative embodiment. As shown in FIG. 5, the sequence of operations starts when a new message is received from a sender computing system 385 at the instant messaging platform. The instant message delivery subsystem 310 delivers the instant message (new message) to the receiver computing system 380 and also provides the new message to the instant message initial scan/filter subsystem 320 at substantially the same time. The initial scan/filter subsystem 320 performs a lightweight initial scan/filter operation to make an initial evaluation as to whether the new message is unwanted/ malicious (referred to as "malicious" in the example diagram) or benign. If the message is benign, then no further actions are needed and the operation terminates. However, as assumed in the depicted example, if new message is initially considered to be likely to be malicious, the malicious indication causes the warning message injection subsystem 330 to inject a warning message into the dialog interface 384 at the receiver computing device 380. This may include causing the hyperlinks and other user selectable elements to be disabled. In some cases, this may cause the instant messaging application, agent, or the like, to disable the user's ability to respond to the message prior to a final determination of the message being benign or unwanted/ malicious.

At substantially a same time as the warning message injection subsystem 330 is injecting the warning message, the initial scan/filter subsystem 320 may send the new message to the message analytics pipeline 340 for more detailed analysis. The various analytics engine(s) of the pipeline 340 processes the new message and generates a classification of the new message as to whether it is benign or unwanted/malicious and outputs this classification to the responsive action subsystem 360. The responsive action subsystem 360 then sends a responsive action command message to the receiver computing system 380 to cause the receiver computing system 380 to perform a responsive action based on whether the message was determined to be benign or unwanted/malicious. For example, benign messages may be simply presented and the warning message removed from the dialog interface 384. If the message is unwanted/malicious, the message may be deleted, disabled, obscured, or otherwise modified so as to protect the user of the receiver computing device from interacting with or otherwise responding to the message. In either case, the final classification may be indicated to the user via the dialog interface 384.

Figure 6A:
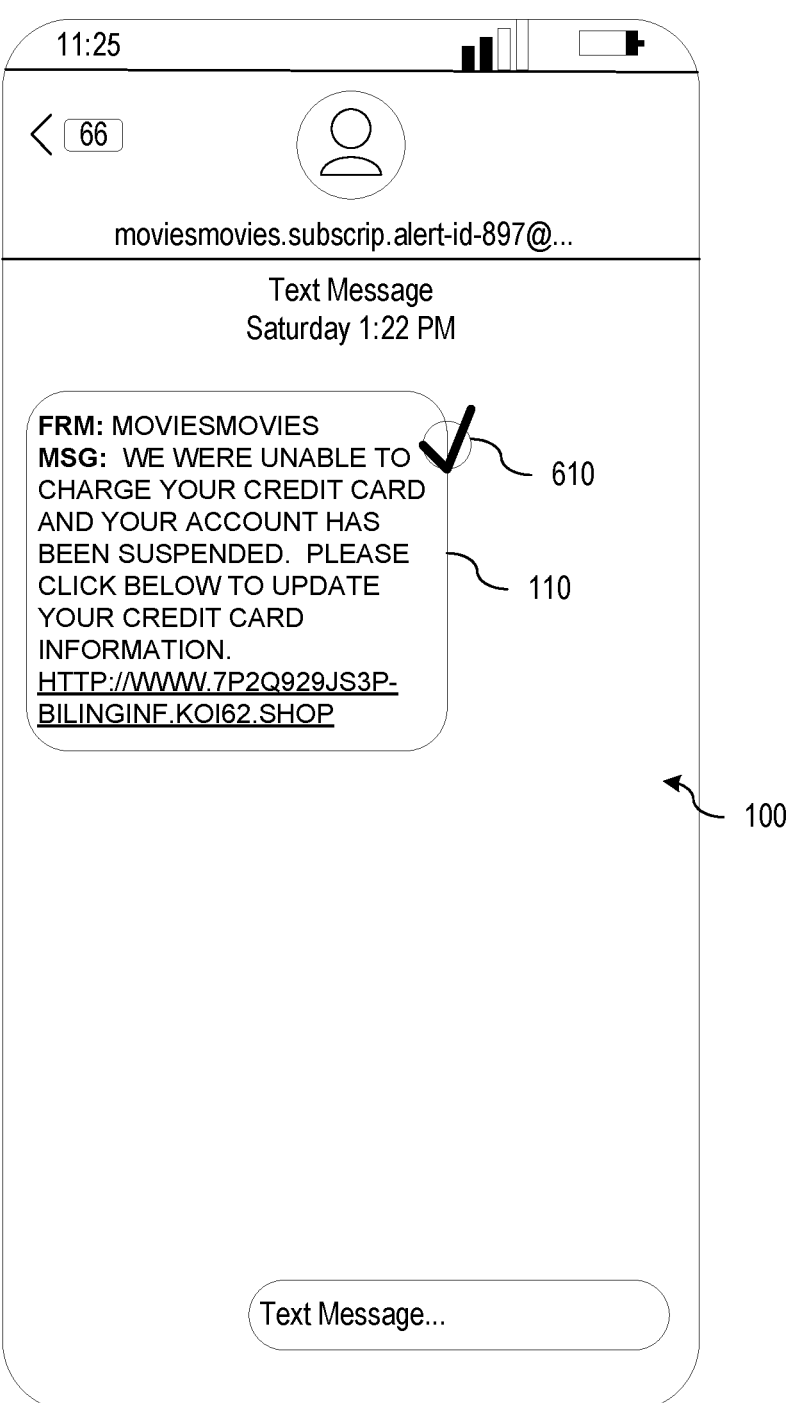
FIG. 6A-6C are example diagrams of updated dialogs that may be generated in accordance with one or more illustrative embodiments.
Figure 6B:
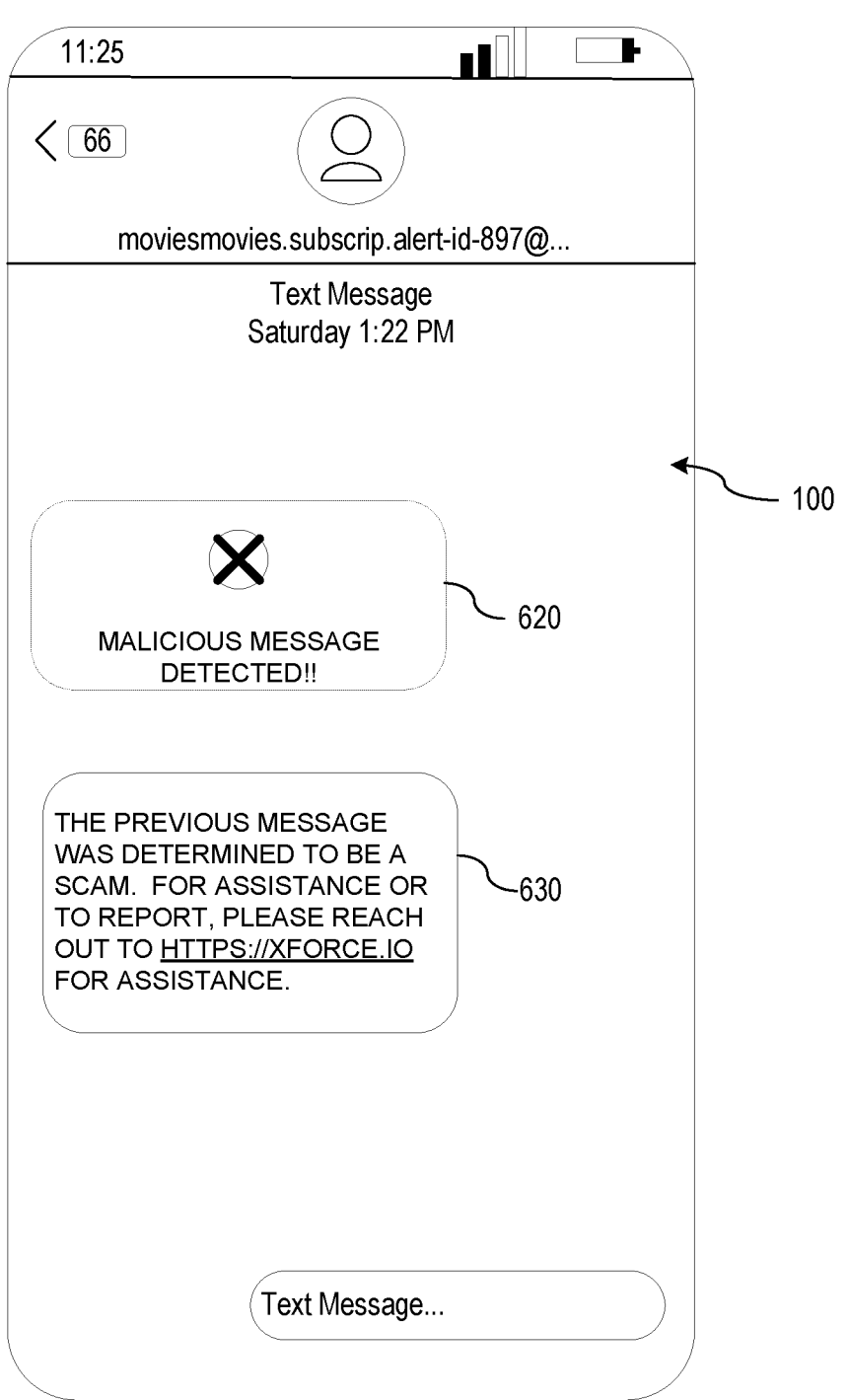
Figure 6C:
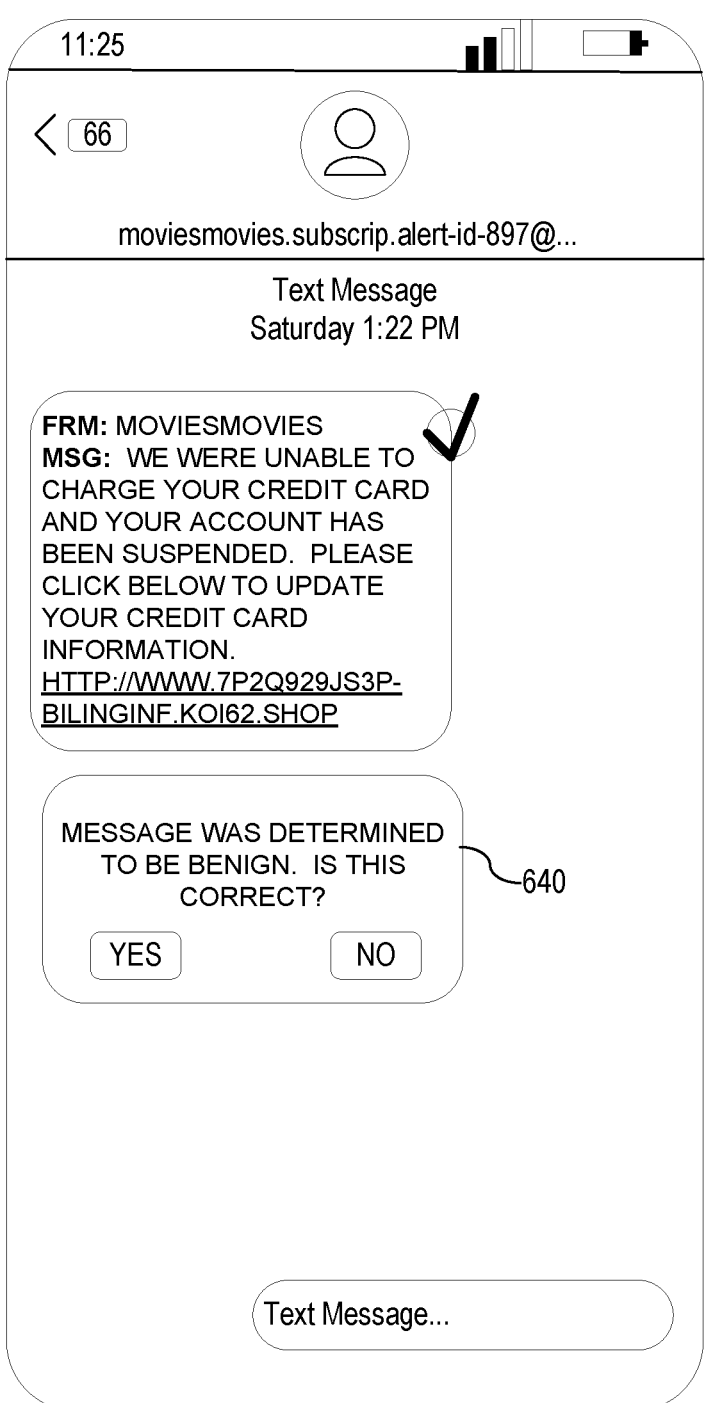

FIG. 6A-6C are example diagrams of updated dialogs that may be generated in accordance with one or more illustrative embodiments. As noted above, the dialog interface 384 may be modified in response to a final classification of a message after having presented a warning notification message in the dialog and having performed a more detailed analysis of the new instant message. For example, as shown in FIG. 6A, assuming that a previous warning message has been presented as in FIG. 1, for example, the dialog interface 384 may be further modified when the message is determined to be benign by simply removing the warning message and adding a graphical indicator 610 indicating the previously displayed message has been checked and determined to be benign.

In FIG. 6B, assuming that the message was determined to be unwanted/malicious, the message may be removed and an indicator 620 added to indicate that the message was checked and determined to be malicious. In some cases, a subsequent follow-up message 630 may be provided to provide the user with an ability to initiate a chat session with a cybersecurity expert to assist with the situation, reporting the situation to a cybersecurity platform, or the like.

In FIG. 6C, as a further example, an additional follow-up message 640 may be presented through which a user can specify, through user feedback, whether the classification is considered by the user to be accurate or inaccurate. The user feedback may be collected from a plurality of users and used as a basis for modifying the training of the analytics and machine learning computer models of the pipeline 340 so as to reduce the erroneous classifications. Moreover, this feedback may be used to update the user's individual data structures maintained by the protected message system 300, e.g., updating the whitelists, blacklists, contact lists, and the like, associated with the individual user or recipient of instant messages.

Figure 7:
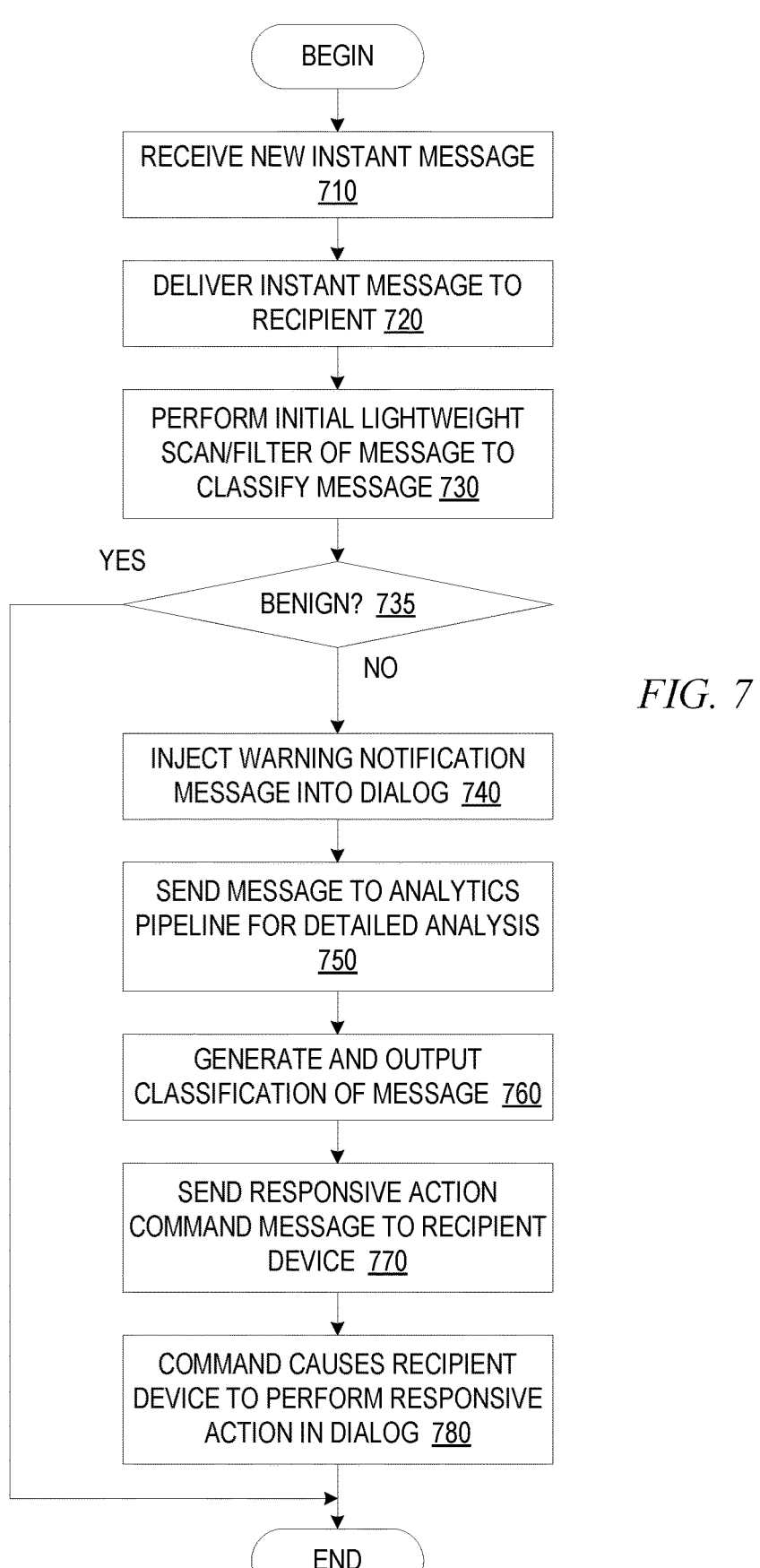
FIG. 7 is a flowchart outlining an example operation of a message protection system in accordance with one illustrative embodiment.

FIG. 7 is a flowchart outlining an example operation of a message protection system in accordance with one illustrative embodiment. It should be appreciated that the operations outlined in FIG. 7 are specifically performed automatically by an improved computer tool of the illustrative embodiments and are not intended to be, and cannot practically be, performed by human beings either as mental processes or by organizing human activity. To the contrary, while human beings may, in some cases, initiate the performance of the operations set forth in FIG. 7, and may, in some cases, make use of the results generated as a consequence of the operations set forth in FIG. 7, the operations in FIG. 7 themselves are specifically performed by the improved computing tool in an automated manner.

As shown in FIG. 7, the operation starts by receiving a new message for delivery to a recipient (step 710). The instant message delivery subsystem delivers the instant message (new message) to the receiver computing system and also provides the new message to the instant message initial scan/filter subsystem at substantially the same time (step 720). The initial scan/filter subsystem performs a lightweight initial scan/filter operation to make an initial evaluation as to whether the new message is unwanted/ malicious (referred to as "malicious" in the example diagram) or benign (step 730). If the message is benign (step 735), then no further actions are needed and the operation terminates. However, if the new message is initially considered to be likely to be malicious, the malicious indication causes the warning message injection subsystem to inject a warning message into the dialog interface at the receiver computing device (step 740).

At substantially a same time as the warning message injection subsystem is injecting the warning message, the initial scan/filter subsystem may send the new message to the message analytics pipeline for more detailed analysis (step 750). The various analytics engine(s) of the pipeline processes the new message and generates a classification of the new message as to whether it is benign or unwanted/ malicious and outputs this classification to the responsive action subsystem (step 760). The responsive action subsystem then sends a responsive action command message to the receiver computing system (step 770) to cause the receiver computing system to perform a responsive action based on whether the message was determined to be benign or unwanted/malicious (step 780). The operation then terminates.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for delivering instant messages to recipient computing systems, the method comprising:
   receiving an instant message from a source computing system for delivery to a recipient computing system;
   sending the instant message to the recipient computing system which displays the instant message in a dialog interface on the recipient computing system;
   executing, at substantially a same time as the instant message is sent to the recipient computing system, a lightweight initial scan and filter operation on the instant message to determine a preliminary classification of the instant message as being a first type message corresponding to a benign message, or a second type message corresponding to an unwanted or malicious message; and
   in response to the preliminary classification indicating the instant message to be the second type message:
      sending a warning notification message to the recipient computing device for displaying of the warning notification message in the dialog interface;
      processing the instant message by an analytics pipeline to determine a final classification of the instant message as being either the first type message or the second type message; and
      sending a command message to the recipient computing device to update the dialog interface of the recipient computing device based on the final classification of the instant message.

2. The method of claim 1, wherein the warning notification message is displayed in the dialog interface substantially immediately after the representation of the received instant message in the dialog interface, and in a same dialog session with a user of the recipient computing system.

3. The method of claim 1, wherein the lightweight initial scan and filter operation evaluates fewer factors of the received instant message, when determining the preliminary classification, than a number of factors evaluated by the analytics pipeline to determine the final classification of the instant message.

4. The method of claim 1, wherein the lightweight initial scan and filter operation evaluates at least one of whether an identifier of the sender of the instant message is located in a contacts list or authorized sender list associated with the recipient computing system, or whether the instant message is responsive to a previous instant message sent by the recipient computing system.

5. The method of claim 1, wherein, in response to the final classification indicating that the instant message is classified as the first type message, the command message to update the dialog interface comprises a command for the recipient computing system to remove the warning notification from the dialog interface.

6. The method of claim 1, wherein the warning notification message comprises a hyperlink for accessing a help service of an instant messaging service platform to assist a user of the recipient computing system with the instant message.

7. The method of claim 1, wherein the analytics pipeline comprises one or more trained machine learning computer models that receive features of the input message as input and classify the input message as to whether the input message is the first type message or second type message.

8. The method of claim 1, wherein:
   the analytics pipeline comprises a plurality of trained machine learning computer models that receive features of the input message as input and classify the instant message as to whether the input message is the first type message or second type message,
   each machine learning computer model generates a separate classification output for the instant message, and
   the separate classification outputs from the plurality of trained machine learning computer models are combined to generate the final classification of the instant message.

9. The method of claim 8, wherein each of the trained machine learning computer models in the plurality of trained machine learning computer models operate on a different set of input features than other trained machine learning computer models in the plurality of trained machine learning computer models.

10. The method of claim 1, wherein the command message to update the dialog interface comprises a command message instructing the recipient computing system to perform at least one of removal of the instant message from the dialog interface, disabling hyperlinks in the instant message, obscuring content of the instant message, reporting the source of the instant message to an authority, outputting a graphical indicator in association with the instant message indicating a classification of the instant message, replacing the instant message with a replacement message or graphic, or injecting a message with a user selectable operation to initiate an incident response or live chat with authorized personnel via the recipient computing system.

11. A computer program product comprising a computer readable storage medium having a computer readable program stored therein, wherein the computer readable program, when executed on a computing device, causes the computing device to:
   receive an instant message from a source computing system for delivery to a recipient computing system;
   send the instant message to the recipient computing system which displays the instant message in a dialog interface on the recipient computing system;
   execute, at substantially a same time as the instant message is sent to the recipient computing system, a lightweight initial scan and filter operation on the instant message to determine a preliminary classification of the instant message as being a first type message corresponding to a benign message, or a second type message corresponding to an unwanted or malicious message; and in response to the preliminary classification indicating the instant message to be the second type message:

send a warning notification message to the recipient computing device for displaying of the warning notification message in the dialog interface;

process the instant message by an analytics pipeline to determine a final classification of the instant message as being either the first type message or the second type message; and send a command message to the recipient computing device to update the dialog interface of the recipient computing device based on the final classification of the instant message.

12. The computer program product of claim 11, wherein the warning notification message is displayed in the dialog interface substantially immediately after the representation of the received instant message in the dialog interface, and in a same dialog session with a user of the recipient computing system.

13. The computer program product of claim 11, wherein the lightweight initial scan and filter operation evaluates fewer factors of the received instant message, when determining the preliminary classification, than a number of factors evaluated by the analytics pipeline to determine the final classification of the instant message.

14. The computer program product of claim 11, wherein the lightweight initial scan and filter operation evaluates at least one of whether an identifier of the sender of the instant message is located in a contacts list or authorized sender list associated with the recipient computing system, or whether the instant message is responsive to a previous instant message sent by the recipient computing system.

15. The computer program product of claim 11, wherein, in response to the final classification indicating that the instant message is classified as the first type message, the command message to update the dialog interface comprises a command for the recipient computing system to remove the warning notification from the dialog interface.

16. The computer program product of claim 11, wherein the warning notification message comprises a hyperlink for accessing a help service of an instant messaging service platform to assist a user of the recipient computing system with the instant message.

17. The computer program product of claim 11, wherein the analytics pipeline comprises one or more trained machine learning computer models that receive features of the input message as input and classify the input message as to whether the input message is the first type message or second type message.

18. The computer program product of claim 11, wherein:

the analytics pipeline comprises a plurality of trained machine learning computer models that receive features of the input message as input and classify the instant message as to whether the input message is the first type message or second type message, each machine learning computer model generates a separate classification output for the instant message, and the separate classification outputs from the plurality of trained machine learning computer models are combined to generate the final classification of the instant message.

19. The computer program product of claim 18, wherein each of the trained machine learning computer models in the plurality of trained machine learning computer models operate on a different set of input features than other trained machine learning computer models in the plurality of trained machine learning computer models.

20. An apparatus comprising:

at least one processor; and at least one memory coupled to the at least one processor, wherein the at least one memory comprises instructions which, when executed by the at least one processor, cause the at least one processor to:

receive an instant message from a source computing system for delivery to a recipient computing system;

send the instant message to the recipient computing system which displays the instant message in a dialog interface on the recipient computing system;

execute, at substantially a same time as the instant message is sent to the recipient computing system, a lightweight initial scan and filter operation on the instant message to determine a preliminary classification of the instant message as being a first type message corresponding to a benign message, or a second type message corresponding to an unwanted or malicious message; and in response to the preliminary classification indicating the instant message to be the second type message:

send a warning notification message to the recipient computing device for displaying of the warning notification message in the dialog interface;

process the instant message by an analytics pipeline to determine a final classification of the instant message as being either the first type message or the second type message; and send a command message to the recipient computing device to update the dialog interface of the recipient computing device based on the final classification of the instant message.

* * * * *